INVENTORS
William S. Wolfram, &
BY James W. Houston

Hugh L. Fisher
ATTORNEY

March 19, 1963 W. S. WOLFRAM ETAL 3,081,856
TORQUE TRANSMITTING MECHANISM
Filed Sept. 14, 1959 2 Sheets-Sheet 2

INVENTORS
William S. Wolfram, &
BY James W. Houston

Hugh L. Fisher
ATTORNEY

United States Patent Office 3,081,856
Patented Mar. 19, 1963

3,081,856
TORQUE TRANSMITTING MECHANISM
William S. Wolfram, Birmingham, and James W. Houston, Detroit, Mich., assignors to General Motors Corporation, Detroit, Mich., a corporation of Delaware
Filed Sept. 14, 1959, Ser. No. 839,871
1 Claim. (Cl. 192—104)

This invention relates generally to torque transmitting mechanism and particularly to torque transmitting mechanism of the centrifugally controlled type adapted, although not exclusively, for driving vehicle engine accessories.

In general, a torque transmitting mechanism of the centrifugal kind includes concentrically spaced driving and driven members between which are disposed friction shoes. Usually radially positioned springs urge the friction shoes into engagement with a drum portion of the driving member such that when a predetermined speed of the driven member is exceeded, the friction shoes due to the corresponding centrifugal force will be forced out of engagement with the driving member drum portion. In installations where the radially disposed springs additionally transfer drive from the friction shoes to the driven member, the springs are subjected to tangential forces and often shear from fatigue or from excessive forces. Also, this latter arrangement is objectionable since there is a so-called epicyclic action, i.e., runout of the driven member relative to the driving member, such that undesired vibrations occur.

Accordingly, the invention seeks to provide a novel torque transmitting mechanism of the foregoing character having provision for resiliently transferring drive between the friction shoes and one of the members so as to relieve the biasing structure of shear forces and so as to facilitate maintenance of the concentricity between the members of the mechanism. Specifically, drive springs are circumferentially arranged between the friction shoes and the coacting member so as to transfer the tangential drive loads therebetween.

Another concern in a centrifugally operated friction type torque transmitting mechanism is the heat dissipation along the engaging surfaces, for excessive heat can cause distortion of engaging surfaces as well as produce cracks. Additionally, during operation the temperature differentials existing between a hot drum and a cool hub induce thermal stresses into the ribs. These problems are particularly bothersome when the mechanism is being operated above the control speed, i.e., the speed above which the friction shoes disengage since slippage is greatest at this speed.

Therefore, the invention provides a unique arrangment for cooling the mechanism during operation. More particularly, one of the mechanism rotary members is formed with inclined spokes that enhance air circulation in the vicinity of the engaging surfaces, that afford greater heat dissipating areas, that facilitate fabrication by minimizing shrinkage stresses, and that overcome the problem of service cracks and drum distortion during operation. The invention further contemplates utilizing a centrifugal fan for aiding in the circulation of air in the proximity of the mechanism's engaging surfaces.

The foregoing and other objects and advantages of the invention will be apparent from the following description and the accompanying drawings in which.

Figures 1, 2:
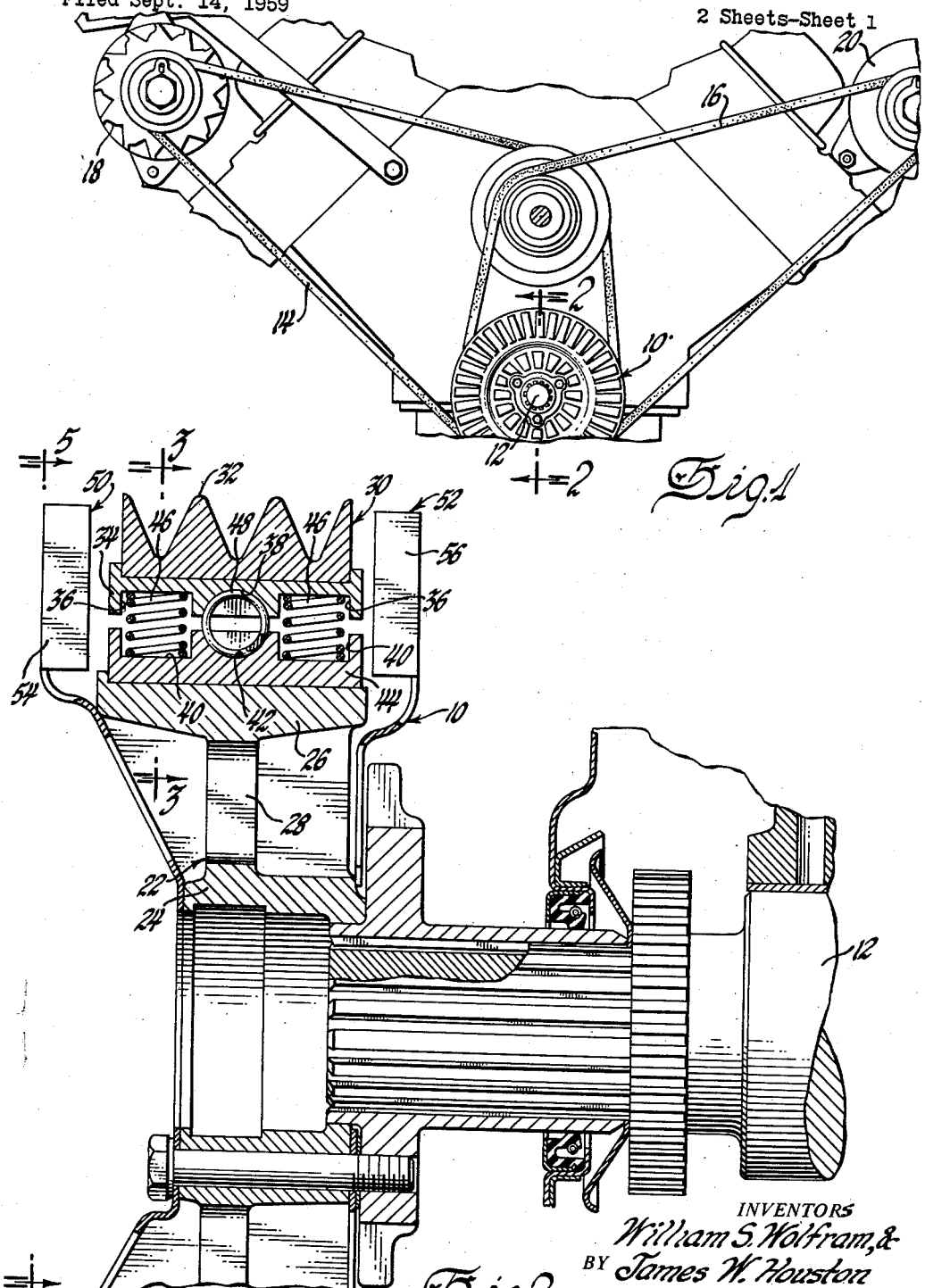
FIGURE 1 is a view of a torque transmitting mechanism, incorporating the principles of the invention, arranged for driving automobile engine accessories.
FIGURE 2 is a sectional view of the torque transmitting mechanism taken along line 2—2 of FIGURE 1.

Referring in detail to the drawings and initially to FIGURE 1, the torque transmitting mechanism depicted is in the form of a centrifugally operated clutch and is assigned the numeral 10. The clutch 10 transfers drive from an engine crankshaft 12 through belts 14 and 16 respectively to a generator 18 and an air conditioning compressor 20. Other accessories may be driven by the clutch 10, and also the clutch 10 has utility in other installations.

Figure 5:
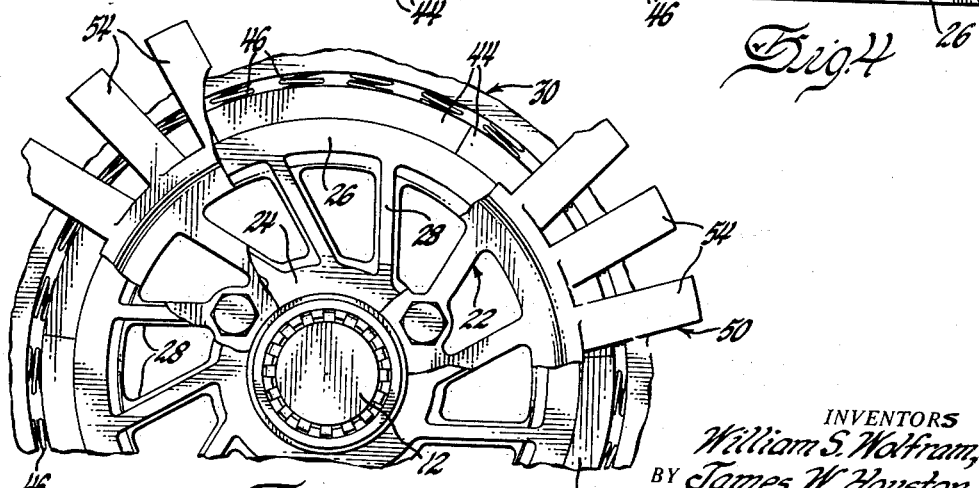
FIGURE 5 is a partial sectional view of the mechanism looking in the direction of arrows 5—5 in FIGURE 2.

For consideration of the details of the clutch 10, reference is made to FIGURE 2 where a driving member, denoted generally at 22, is shown splined at the hub portion 24 thereof, or otherwise annexed to the end of the engine crankshaft 12. The driving member 22 is additionally provided with a drum portion 26 and has slanted ribs or spokes 28 interconnecting the hub and drum portions 24 and 26. The spokes 28 of the driving member 22 are angularly inclined, as viewed in FIGURE 5, so that at the inner end thereof they are substantially tangential to the hub portion 24. As can be seen, by having slanted spokes 28, additional spoke area is obtainable for dissipating heat from the drum portion 26 so as to prevent distortion thereof this enables the driving member 26 to be more easily formed as a casting. Moreover, the slanted spokes will, during operation when the driving member 22 is rotating, function somewhat in the manner of a centrifugal pump thereby producing increased air circulation in the vicinity of the drum portion 26.

Figure 3:
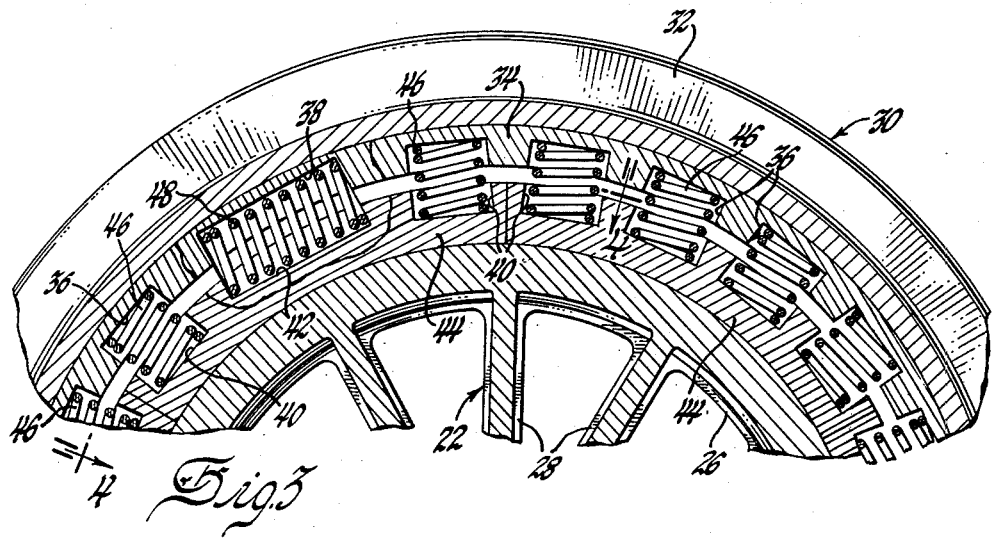
FIGURE 3 is a fragmentary sectional view of the mechanism taken along line 3—3 in FIGURE 2.
Figure 4:
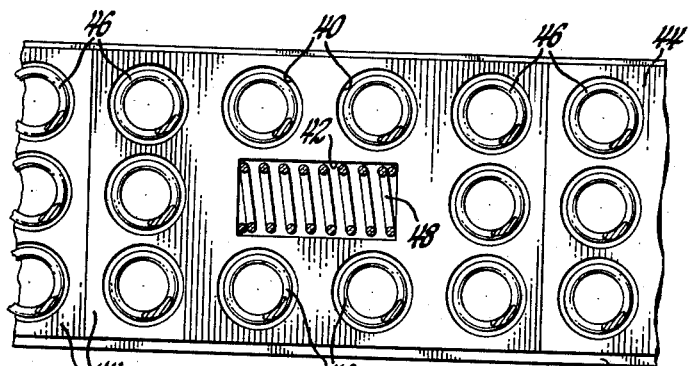
FIGURE 4 is a fragmentary view of the mechanism looking in the direction of the arrows 4—4 in FIGURE 3.

A driven member designated generally at 30 in this embodiment comprises a grooved pulley sheave 32 that is affixed to an annular ring 34. The annular ring 34 is provided as can be seen in FIGURES 3 and 4 with a series of circular pockets 36 and elongated recesses 38. These circular pockets 36 and elongated recesses 38 in the assemblage align respectively with circular pockets 40 and elongated recesses 42 in a series of spaced friction shoes 44. The circular pockets 36 and 40 enclose radially positioned engaging springs 46, and the elongated recesses 38 and 42 enclose drive springs 48.

The friction shoes 44 along the engaging surfaces thereof are provided with suitable material, for producing the desired frictional engagement with the complementary surface of the driving member drum portion 26. The materials, of course, will be determined by the application of the clutch 10. In some instances, the shoes 44 may be made of a material that does not require any additional frictional material. The number of friction shoes 44 will be determined by available spaces and the torque demands.

The engaging springs 46 urge the friction shoes 44 into frictional engagement with the drum portion 26 so that this contact will be maintained until the centrifugal force acting on the friction shoes 44 and corresponding to some predetermined maximum speed of the driven member 30, is adequate to effect a disengagement. This maximum speed will be the control speed at which the clutch 10 operates; hence, the driven member 30 will not be permitted to exceed this speed since the friction shoes 44 will be continuously engaging and disengaging the driving member hub portion 26. At the selected control speed, consideration must also be given to the maximum torque needed to drive the engine accessories and accordingly the clutch 10 is designed to deliver this torque at this speed. The control speed will necessarily be determined by the operating speed of the accessories, and may be easily varied, e.g., by altering the sizes of the engaging springs 46. Below this control speed the clutch 10 will be capable of transferring varied torques inasmuch as the effective centrifugal force will be less at the slower speeds.

The function of the drive springs 48 is now more apparent, for without these springs it can be seen that all of the drive being transferred by the frictional engagement between the shoes 44 and the driving member 22 is transferred through the springs 46 and to the driven member 30. This applies a shear force to each of the engaging springs 46 and causes the driving member 30 to shift, depending on the direction of relative rotation between the driving and driven members 22 and 30 and actually "cocks" or tilts the engaging springs 46 slightly. As a result, eccentricity occurs with a resultant so-called epicyclic action or runout that induces vibrations into the drive system. By installing the drive springs 48, the engaging springs 46 are relieved of this shear load because the drive springs 48 are circumferentially spaced so as to assume and transfer tangential drive loads. These drive springs 48 in addition to transferring the tangential drive loads, absorb shocks due to sudden changes in speed of the driving member 22 and aid in maintaining the concentricity between the driving and driven members 22 and 30 so as to overcome the undesired vibrations resulting from the epicyclic action.

The heat dissipating ability of the slanted spokes 28 has been discussed. To further aid in the circulation of air, centrifugal fans 50 and 52 are attached as observed in FIGURES 2 and 5 to opposite sides of the driving member 22. Vanes 54 and 56 respectively for the fans 50 and 52 may be shaped in any desired manner so as to produce the desired circulation in the critical areas subjected to the frictional generated heat and in this way supplement the spokes 28 in circulating air.

The combination of fans 50 and 52 and the slanted spokes 28 offer a very efficient mode of cooling the clutch 10, thus increasing the life of the friction shoes 44 and the hub portion 24 of the driving member 22. Additionally, the prevention of excessive heat build-ups eliminates the possibility of distortion of any of the components of the clutch 10, such that the effectiveness of the clutch 10 could be substantially reduced.

From the foregoing it can be seen that the clutch 10 is provided with effective heat dissipating structure and additionally the drive springs aid in obtaining greater durability, more accurate control, as well as reduce substantially vibratory noises.

The invention is to be limited only by the following claim.

We claim:

In combination, a driving member including a drum portion, a driven member concentrically displaced relative to the driving member, a friction shoe interposed between the driving member drum portion and said driven member, said driven member containing first and second circumferentially spaced recesses, said friction shoe having first and second recesses therein aligned opposite said driven member recesses respectively to form first and second spring rceiving chambers, a drive spring positioned to extend circumferentially in said first chamber thereby providing an impositive connection for transferring drive loads between said driven member and said friction shoe, and an engaging spring disposed within said second chamber between said driven member and said friction shoe urging said shoe radially into frictional engagement with said driving member drum portion, said drive spring being positioned to assume and transfer tangential drive loads and prevent the same from being applied to said engaging spring, said engaging spring force being in opposition to centrifugal force acting thereon so as to prevent the driven member from exceeding a selected speed while transmitting a predetermined torque.

References Cited in the file of this patent

UNITED STATES PATENTS

| | | |
|---|---|---|
| 1,842,039 | Matthews | Jan. 19, 1932 |
| 2,506,520 | Spase | May 2, 1950 |
| 2,746,587 | Spase | May 22, 1956 |
| 2,855,079 | Spase | Oct. 7, 1958 |
| 2,863,543 | Spase | Dec. 9, 1958 |
| 2,863,544 | Spase | Dec. 9, 1958 |

FOREIGN PATENTS

| | | |
|---|---|---|
| 283,723 | Great Britain | Jan. 19, 1928 |